United States Patent [19]

Hotta

[11] Patent Number: 4,561,725

[45] Date of Patent: Dec. 31, 1985

[54] ELECTRO-OPTICAL DEVICE HAVING HOMOGENEOUS ALIGNMENT LAYER HARDENED WITH CROSS-LINKING AGENTS

[75] Inventor: Yoshio Hotta, Atsui, Japan

[73] Assignee: Canon Kabushiki Kaisha, Tokyo, Japan

[21] Appl. No.: 577,210

[22] Filed: Feb. 6, 1984

[30] Foreign Application Priority Data

Feb. 9, 1983 [JP] Japan ................................ 58-20787
Feb. 14, 1983 [JP] Japan ................................ 58-23471
Apr. 5, 1983 [JP] Japan ................................ 58-60268

[51] Int. Cl.$^4$ ............................................. G02F 1/13
[52] U.S. Cl. ................................. 350/341; 350/339 F
[58] Field of Search ............................ 350/339 F, 341

[56] References Cited

U.S. PATENT DOCUMENTS 3,966,305 6/1976 Young ................................. 350/341
4,273,420 6/1981 Watanabe et al. .................. 350/341

FOREIGN PATENT DOCUMENTS 2406350 8/1974 Fed. Rep. of Germany ...... 350/341
2916670 11/1980 Fed. Rep. of Germany ...... 350/341
54-114257 9/1979 Japan ................................. 350/341

*Primary Examiner*—John K. Corbin
*Assistant Examiner*—Richard F. Gallivan
*Attorney, Agent, or Firm*—Fitzpatrick, Cella, Harper & Scinto

[57] ABSTRACT

An electro-optical device comprises a liquid crystal layer sandwiched between two electrode plates, wherein at least one of said electrode plates has a film of a resin hardened in the presence of a cross linking agent on its surface and said film is subjected to aligning treatment.

17 Claims, 2 Drawing Figures

ELECTRO-OPTICAL DEVICE HAVING HOMOGENEOUS ALIGNMENT LAYER HARDENED WITH CROSS-LINKING AGENTS

BACKGROUND OF THE INVENTION

1. Field of the Invention

This invention relates to an electro-optical device, particularly a liquid crystal display device using a nematic liquid crystal having positive dielectric anisotropy.

2. Description of the Prior Arts

Nematic liquid crystal (hereinafter abbreviated as N-liquid crystal) display device effects displaying by utilization of changes in optical characteristics by application of electrical field, magnetic field, ultra-sonic wave, etc., and is known to be used for optical modulation and others. This is generally constituted of N-liquid crystal sandwiched between two sheets of substrates, of which one is transparent, provided face to face at an interval of 50μ or less, and its changes in molecular arrangement by application of electrical field, magnetic field, ultra-sonic wave, etc. are utilized for optical modulation. In the case of applying an electrical field, an electrode plate having a thin layer of electroconductive coating applied on one surface of a supporting plate such as glass plate is used as the substrate.

Compounds for the above N-liquid crystal are classified into two kinds with respect to the molecular structure and dielectric property. One is a kind in which the molecular axis and the electric dipole are substantially perpendicular to each other (this is called as Nn-liquid crystal), and the other is a kind in which they are substantially parallel to each other (this is called Np-liquid crystal). Nn means an N-liquid crystal having negative dielectric anisotropy, and Np an N-liquid crystal having positive dielectric anisotropy. The Np-liquid crystal electro-optical device generally employed in the prior art has a structure having a Np-liquid crystal sandwiched between confronting two sheets of electrode plates. In this case, the molecular axis of the Np-liquid crystal is parallel to the electrode plates, and the direction of the molecular axis will be aligned in substantially the same direction on the plane parallel to the electrode plate, and the electrode plate, and the electrode plates arranges the molecules so that they may be twisted continuously from each other in the direction perpendicular to the electrode. Such an alignment of molecular axis can be achieved by rubbing the electrode surfaces in one direction with a cloth or a paper and injecting a liquid crystal between the two sheets of electrodes superposed so that the rubbed directions may be crossed over each other. In the vicinity of the electrode surface, the molecular axes of liquid crystal are known to be regularly aligned in the polished direction, while the molecular axes to take the directions continuously twisted within the liquid crystal layer.

However, according to this method, alignment cannot be uniform and will disadvantageously be lost within a short period of time. Also, alignment destruction is known to occur under heating.

As the method for overcoming these drawbacks, it is known to rub the electrode plates in one direction with a surfactant used simultaneously. However, the surfactant may cause deterioration of a liquid crystal, and it may further be decomposed or denatured by electrical field upon continuous application of a voltage, whereby alignment may be destroyed. As another method, it is also known to coat the surface of an electrode plate with a certain kind of polymer such as polyimide or polyamideimide, and subjecting the coated polymer layer to aligning treatment. However, for example, in the case of providing a coating of polyimide on an electrode plate, after application of a polyamide carboxylic acid solution using a polar solvent such as dimethylacetamide on an electrode plate, the polyamide carboxylic acid can be subjected to dehydrating ring closure to form a polyimide film. Such a polyimide film, while it is excellent in heat resistance and aligning controllability for the liquid crystal, is required to be treated at a high treating temperature of 250° C. to 300° C. or above during formation of the film, and the solvent employed is strongly toxic, polar solvent, such as dimethylformamide, dimethylacetamide, dimethyl sulfoxide, N-methylpyrrolidone, etc. and must be carefully handled under the present situation. On the other hand, polyvinyl alcohol is a water-soluble resin, and therefore water can be used as the solvent and has no such toxicity as possessed by the solvents as mentioned above so that is can be easily handled. However, when a film formed of polyvinyl alcohol is used as the alignment film, it has the disadvantage of poor durability.

SUMMARY OF THE INVENTION

An object of the present invention is to provide a liquid crystal display device improved in various points as mentioned above, particularly a liquid crystal display device improved in stability of liquid crystal molecule-aligning property to heat and stability of such property with lapse of time.

Such an object of the present invention can be accomplished by use of an electrode plate of which the substrate having an electroconductive film provided thereon is coated with a film of a resin hardened in the presence of a cross linking agent and its surface is subjected to aligning treatment as the electrode plate constituting an electro-optical device, particularly a liquid crystal display device.

According to the present invention, there is provided an electro-optical device comprising a liquid crystal layer sandwiched between two electrode plates, wherein at least one of said electrode plates has a film of a resin hardened in the presence of a cross linking agent on its surface and said film is subjected to aligning treatment.

DETAILED DESCRIPTION OF THE PREFERRED EMBODIMENTS

Figure 1:
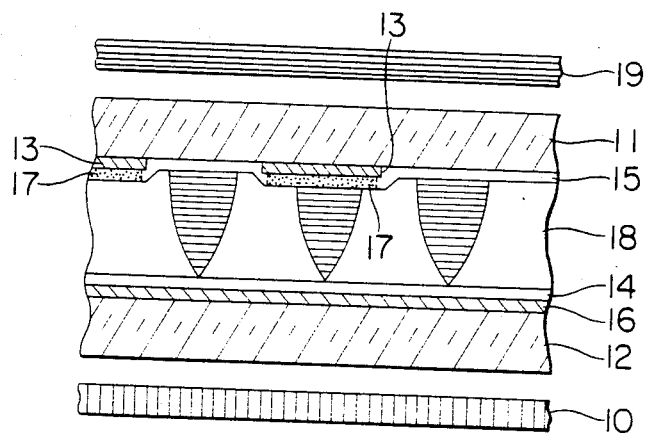
FIG. 1 shows a sectional view of the liquid crystal display device of the present invention.

The resin to be used in the electro-optical device of the present invention can be chosen from a wide variety of resins. In particular, polyvinyl alcohol is one of preferable resins. Otherwise, it is also possible to use a water-soluble resin such as polyvinyl pyrrolidone, methyl cellulose, hydroxyethyl cellulose, sodium alginate, sodium polyacrylate, and the like. These water-soluble resins may be used either singly or in combination of two or more resins.

These water-soluble resins may be dissolved in a solvent such as water, alcohols (e.g. methanol, ethanol, isopropanol, etc.) or a mixture thereof, and hardened under predetermined hardening conditions after addition of a compound having two or more active groups such as ammonium dichromate, magnesium chloride, dimethylol melamines or dialdehydes as the cross linking agent (agent for forming water-resistant and water-insoluble coated film) to this solution. The aforesaid dialdehydes may include glyoxal, malondialdehyde, succindialdehyde, glutaric dialdehyde, maleic dialdehyde, phthalaldehyde, isophthalaldehyde, terephthalaldehyde, and the like. Among them, glyoxal, glutaric dialdehyde are preferred. Particularly, glyoxal is preferable.

The cross linking agent to be formulated with the water-soluble resin may be 0.1 to 100 parts by weight, preferably 1 to 50 parts by weight based on 100 parts by weight of the water-soluble resin.

A water-soluble resin containing ammonium dichromate can be hardened by appropriate photoirradiation, particularly UV-ray irradiation and a water-soluble resin containing dimethylol melamine or a dialdehyde can be hardened by heating at an appropriate temperature (e.g. 100°–300° C.).

The water-soluble resin to be used in the present invention may be provided on an electrode plate by, for example, applying an aqueous solution of polyvinyl alcohol containing ammonium dichromate and glyoxal added as the cross linking agent according to brush coating, dip coating, spinner coating, spray coating or bar coating on an electrode plate, followed by drying, and hardening the dried coating under predetermined conditions to form a hardened film of the water-soluble resin.

The film of a water-soluble resin treated with the cross linking agent is subjected to a homogeneous aligning treatment in one direction with cloth, etc., such as rubbing treatment. The film subjected to aligning treatment can be improved in stability, and also the aligning characteristic with lapse of time can be stabilized.

According to a preferred embodiment of the present invention, an electrode plate, of which the surface provided with an electroconductive film is covered with a film of a hardened polyvinyl alcohol having residual groups having active hydrogen such as acetoacetylated or phophoric acid-esterified polyvinyl alcohol and of which surface is subjected to aligning treatment, may be used as the electrode plate constituting an electro-optical device, particularly a liquid crystal display device.

The acetoacetylated polyvinyl alcohol (hereinafter polyvinyl alcohol is referred to merely as "PVA") can be obtained by, for example, contacting PVA with diketene gas either under reduced pressure, under normal pressure or under pressurization, while maintaining PVA resin under fluidized or stirred state, thereby producing PVA having an acetoacetyl group.

The contact temperature may be 30° to 250° C., preferably 50° to 200° C., and it is preferred to effect contact of PVA with diketene gas under the conditions of a temperature and diketene partial pressure where gaseous diketene is not liquefied during contact, but formation of a part of the gas into liquid droplets will cause no trouble.

The contact time may differ depending on the contact temperature, namely longer when the temperature is lower or shorter when the temperature is higher, and suitable be selected from the range of from 1 minute to 6 hours.

In supplying diketene gas, diketene gas as such or as a gas mixture with an inert gas may be supplied, and the powdery PVA type resin after absorption of said gas may be elevated in the temperature, but it is preferred to contact the resin with the gas, while heating the resin, or after the resin has been heated.

The powdery PVA type resin to be put to acetoacetylation may preferably be freed of volatiles such as water or methanol before use, since water or methanol will consume diketene. This resin may preferably be a powder as fine as possible, with a particle size of 10 to 450 mesh, preferably 60 mesh or lower.

The powdery PVA type resin generally contains sodium acetate, and therefore it is not necessary to add specifically a catalyst in most case, but the level of sodium acetate is 0.01 to 2.0%, preferably 0.1 to 1.0%.

As the PVA type resin, there may be employed PVA obtained by saponification of a lower alcoholic solution of polyvinyl acetate with a saponification catalyst such as an alkali, or its derivative, and further a saponified product of a copolymer of vinyl acetate with a monomer copolymerizable with vinyl acetate.

Such monomers may include unsaturated carboxylic acids and esters thereof such as maleic acid (anhydride), fumaric acid, crotonic acid, itaconic acid, (meth) acrylic acid and the like; α-olefins such as ethylene, propylene and the like; olefinsulfonic acids such as (meth)allylsulfonic acid, ethylenesulfonic acid, alkyl sulfomaleate and the like; olefinsulfonic acid alkali salts such as sodium (meth)allylsulfonate, sodium ethylenesulfonate, alkyl sodium sulfo(meth)acrylate, monoalkyl sodium sulfomaleate, alkyl disodium sulfomaleate and the like; amide containing monomers such as N-methylolacrylamide, acrylamidealkylsulfonic acid alkali salts, etc.; and further N-pyrrolidone, N-vinylpyrrolidone derivatives; and so on.

On the other hand, phosphoric acid-esterified PVA can be obtained by, for example, allowing PVA to react with phosphoric acid. As the phosphoric acids to be used in this reaction, there may be included oxyacids of phosphoric acid such as orthophosphoric acid, pyrophosphoric acid, triphosphoric acid, tetraphosphoric acid, polyphosphoric acid, metaphosphoric acid, phosphorous acid, hypophosphoric acid, hypophosphorous acid and the like. As PVA, there may be employed, in addition to PVA having various polymerization degrees and saponification degrees, saponified copolymers of vinyl esters such as vinyl acetate with other copolymerizable monomers (e.g. α-olefins such as ethylene, propylene, isobutylene, α-octene, α-dodecene, α-octadodecene and the like; unsaturated carboxylic acids such as acrylic acid, methacrylic acid, crotonic acid, maleic acid and the like or alkyl esters or acid amides thereof; acrylonitrile or methacrylonitrile, vinyl ether, vinyl ketone, olefinsulfonic acid salts, etc.) or also PVA derivatives obtained by postmodification of PVA or the copolymerization modified PVA by acetalation, urethanization or cyanoethyletherification. In short, the polyvinyl alcohol polymer as mentioned herein may be any polymer having at least partially vinyl alcohol units in the polymer.

The reaction temperature is generally about 50° C. to 170° C., suitably inter alia 60° to 120° C., when the reaction is proceeded in a reactor equipped with a stirrer. At too low a reaction temperature, it will take a long time for the progress of the reaction, while at too high a temperature, there may be the risk that the product may be colored or become insoluble and infusible.

The composition to be charged may suitably be 4 parts or more by weight of phosphoric acids per 100 parts by weight of a vinyl alcohol polymer.

The content of the acetoacetyl groups or phosphoric acid ester groups in the PVA resin in the present invention can be from 0.05 mole % up to the highest level within the range maintaining the water solubility, but generally 0.1 to 40 mole %, preferably 0.2 to 20 mole %.

The cross linking agent to be formulated with the PVA resin may be 0.1 to 100 parts by weight, preferably 1 to 50 parts by weight based on 100 parts by weight of the PVA resin.

The above mentioned PVA resin containing ammonium dichromate can be hardened by appropriate photoirradiation, particularly UV-ray irradiation, and PVA resin containing dimethylol melamine or a dialdehyde can be hardened by heating at an appropriate temperature (e.g. 180°-200° C.).

The PVA resin to be used in the present invention may be provided on an electrode plate by, for example, applying an aqueous solution of PVA containing ammonium dichromate and glyoxal added as the cross linking agent according to brush coating, dip coating, spinner coating, spray coating or bar coating on an electrode plate, followed by drying, and hardening the dried coating under predetermined conditions to form a hardened film of the PVA.

The hardened film of the PVA resin can be removed with an aqueous chromic acid ($CrO_3$) solution, and therefore, for example, the aforesaid film of PVA as formed at the terminal portion and the seal spacer forming portion on an electrode plate during the step of preparing a display device may be removed by employing a conventional photolithographic step and an aqueous chromic acid solution. In particular, by use of such an aqueous chromic acid solution, staining of the seal spacer can be prevented.

The film of a PVA resin treated with the cross linking agent is subjected to a homogeneous aligning treatment in one direction with cloth, etc., such as rubbing treatment. The film subjected to aligning treatment can be improved in stability, and also the aligning characteristic with lapse of time can be stabilized.

As the electrode plate to be used in the liquid crystal display device of the present invention, it is preferred to use a substrate (glass, plastic, etc.) having a transparent electroconductive film [e.g. indium oxide, tin oxide, indium oxide-tin oxide (tin oxide: 0.1-40 wt. %)] provided on at least one side. As the opaque electroconductive film to be used in the present invention, there may be included aluminum, gold, silver, copper and lead films.

The liquid crystal to be sealed into the display device of the present invention is not particularly limited, but various kinds of liquid crystals can suitably be used. In particular, as the liquid crystal to be used as the twisted nematic liquid crystal mode, there may be employed, for example, a nematic liquid crystal having positive dielectric anisotropy such as "ZLI-1216", "ZLI-1253", "ZLI-1285", "ZLI-1414" produced by Merck Co., West Germany, which are mixed liquid crystals comprising phenylcyclohexane type nematic liquid crystal, phenylcyclohexane ester type nematic liquid crystal, biphenylcyclohexane type nematic liquid crystal, cyanobiphenyl type nematic liquid crystal and terphenyl type nematic liquid crystal, "ZLI-b 1565", which is a mixed crystal comprising phenylcyclohexane type nematic liquid crystal, cyanobiphenyl type nematic liquid crystal, biphenyl cyclohexane type nematic liquid crystal and terphenyl type nematic liquid crystal, or "ZLI-1694", which is a mixed crystal comprising phenylcyclohexane type nematic liquid crystal, phenylcyclohexane ester type nematic liquid crystal, biphenylcyclohexane type nematic liquid crystal, biphenylcyclohexane ester type nematic liquid crystal and terphenyl type nematic liquid crystal.

The present invention is described in detail below by referring to an embodiment of a liquid crystal display device as the electro-optical device of the present invention, but the present invention is not limited thereto.

FIG. 1 is a sectional view of the display device of the present invention. In FIG. 1, numerals 11 and 12 show substrates such as glass plates or plastic plates. On the inner side of the substrate 11 is formed a segment electrode 13 subjected to patterning of a desired shape, and a hardened film 15 of PVA is further covered thereon. The segment electrode 13 may be formed of a transparent electroconductive film such as of indium oxide or tin oxide.

The above film 15 may be stained at the portion 17 covering over the segment 13 by an appropriate method to give a half display (display colored with a pale color dye) for discrimination. The film 15 is subjected to aligning treatment by rubbing the film in the direction perpendicular to the direction of aligning treatment applied on the insulating film 14 provided on the confronting common electrode 16, whereby the liquid crystal 18 is aligned in a twisted form at an angle of 90°. As the liquid crystal 18, a nematic liquid crystal (hereinafter called Np liquid crystal) having positive dielectric anisotropy is employed.

Outside of the liquid crystal cell of such a structure, there are arranged polarizing plates 10 and 19 under the state of crossed nicols.

Figure 2:
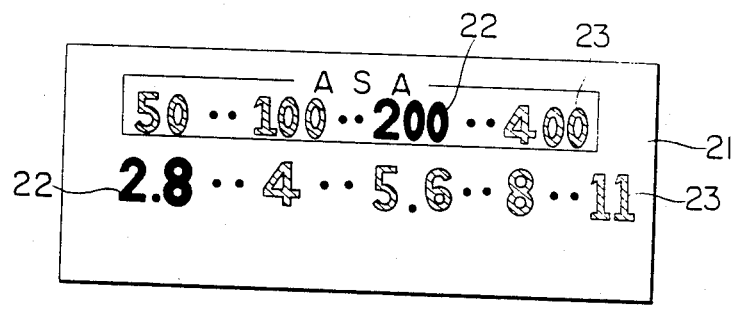
FIG. 2 is a plane view of the liquid crystal display device of the present invention.

In the liquid crystal display device, when a voltage is applied between the segment electrode 13 and the common electrode 16, the molecular axis of the Np liquid crystal 18 is aligned in the direction of the electrical field, whereby the incident light is intercepted between the crossed nicols to give an impression as the black display 22 in the liquid crystal display device 21 as shown in FIG. 2, and this pale black display 22 can be discriminated from the half display 23 which can be seen as the dyed color.

In the liquid crystal display device as shown in FIG. 1 and FIG. 2, by using polarizing plates colored in blue, gray or red as the polarizing plates 10 and 19, the tone effect in this device can be enhanced. It is also possible to dispose a reflection plate (not shown) having light scattering characteristic behind the polarizing plate 10.

As the method for dyeing the portion 17 covering over the segment electrode 13, there may be employed, for example, the method which comprises forming a film 15 on a substrate having a transparent electro-conductive film subjected to patterning of a desired shape, further forming a film of a photoresist material on the film 15, thereafter applying desired exposure and development so as to form a mask at the portion except for the aforesaid electrode portion and then dipping the masked product in a dyeing solution (e.g. 2% ammonia solution of "Sumfix Super Brilliant Red 3BF" produced by Sumitomo Kagaku Co.) to dye the film 15 at the portion covering over the aforesaid electrode, followed by removal of the mask.

The present invention is further described by referring to the following Examples.

EXAMPLE 1

To a 5% aqueous solution of a polyvinyl alcohol ("NL-05", produced by Nippon Gosei Kagaku Kogyo Co., Ltd.) were added ammonium dichromate and glyoxal (1:1) in an amount of 5 wt.% based on the solid of the polyvinyl alcohol. This solution was applied on an electrode plate by means of a spinner coating machine rotating at 2000 rpm for 10 seconds, followed by drying by heating at a temperature of 180° C. for 10 minutes.

As the next step, a pair of electrode plates were subjected to aligning treatment by rubbing in one direction with a cloth and then assembled in a cell so that the rubbing directions may be perpendicular to each other, followed by sealing of a nematic liquid crystal having positive dielectric anisotropy (ZLI-1253", produced by Merck, Co., West Germany), and then the polarizing films on both faces outside of the cell were laminated so that the polarizing directions of the polarizing films may be parallel to the rubbing directions on the adjacent substrates to prepare a display device (this is called Sample No. 1).

On the other hand, as a Control sample, a display device was prepared in the same manner as described above, except for employing a polyvinyl alcohol with the use of the above cross linking agent being omitted in place of the polyvinyl alcohol treated with the cross linking agent used in preparation of the display device of the above Sample No. 1.

For each sample, compulsory test with lapse of time was conducted by storing these samples under the conditions of a temperature of 90° C. and a relative humidity of 65% for 100 hours, 200 hours, 300 hours, 400 hours and 500 hours, respectively, and the ability of liquid crystal display for each lapse of time was observed. As the result, sufficient liquid crystal display ability was observed in Sample No. 1 of the present invention even after 500 hours, but in the Control sample, uniformity in alignment after 300 hours was entirely lost, whereby liquid crystal display was found to be no longer possible.

EXAMPLE 2

According to the same procedure as described in Example 1, except for using a dimethylol melamine in place of the cross linking agent used in preparation of Sample No. 1 in Example 1 to prepare a display device (Sample No. 2).

When compulsory test with lapse of time was conducted for Sample No. 2 in the same manner as in Example 1, sufficient liquid crystal display ability was observed even after 500 hours.

EXAMPLE 3

To a 5% aqueous solution of an acetoacetylated PVA prepared by the method as described below were added ammonium dichromate and glyoxal (1:1) in an amount of 5 wt. % based on the solid of the PVA. This solution was applied on an electrode plate by means of a spinner coating machine rotating at 3000 rpm for 10 seconds to form a film of 1500 Å, followed by drying by heating at a temperature of 120° C. for 30 minutes.

As the next step, for removing the film at the terminal portions and the seal spacer forming portion on the electrode plate, a mask was formed at the portion excluding the terminal portions and the seal spacer forming portion by employing the conventional photolighographic step, followed by dipping of the electrode into a 10% aqueous chromic acid ($CrO_3$) solution of 10 minutes thereby to remove the film formed on the non-mask portion. Then, the resist was peeled off, and the electrode was heated again at 180° C. for 15 minutes.

Subsequently, a pair of electrode plates having thereon the PVA films were subjected to aligning treatment by rubbing in one direction with a cloth and then assembled in a cell so that the rubbing directions on both films may be perpendicular to each other, followed by sealing of a nematic liquid crystal having positive dielectric anisotropy ("ZLI-1253", produced by Merck, Co., West Germany), and then the polarizing films on both faces outside of the cell were laminated so that the polarizing directions of the polarizing films may be parallel to the rubbing directions on the adjacent substrates to prepare a display device (this is called Sample No. 3).

For this sample, compulsory test with lapse of time was conducted by storing this sample under the conditions of a temperature of 85° C. and a relative humidity of 85% for 100 hours, 200 hours, 300 hours, 400 hours, 500 hours and 1000 hours, respectively, and the increase of current in the liquid crystal display device for each lapse of time was measured. As the result, in the Sample No. 3 of the present invention, the increase of current was 10% or less even after 1000 hours, and yet sufficient liquid display ability was observed.

Preparation of Acetoacetylated PVA

PVA powder (saponification degree: 88 mole %, particle size: 80 mesh or less) containing 0.3% of sodium acetate was charged in an amount of 196 parts into a kneader and, while under stirring at a revolutional number of 60 rpm, 16.8 parts of liquid diketene were added by spraying at room temperature over 30 minutes. Then, the temperature was elevated to 60° C., at which the reaction was carried out at 60° C. for 3 hours. As the result, an acetoacetylated PVA resin with an acetoacetylation degree of 3.3 mole % was obtained.

EXAMPLE 4

Except for using dimethylol melamine in place of the cross linking agent used in preparation of Sample No. 3 in Example 3, the same procedure as in Example 3 was followed to prepare a display device (Sample No. 4).

The compulsory test with lapse of time was conducted for Sample No. 4 in the same manner as in Example 3 to obtain the result that the increase of current was 10% or less even after 1000 hours, and yet sufficient liquid crystal display ability was observed.

EXAMPLE 5

Except for using a phosphoric acid-esterified PVA in place of the acetoacetylated PVA used in preparation of Sample No. 4 in Example 4, the same procedure as in Example 4 was followed to prepare a display device (Sample No. 5).

The compulsory test with lapse of time was conducted for Sample No. 5 in the same manner as in Example 3 to obtain the result that the increase of current was 10% or less even after 1000 hours, and yet sufficient liquid crystal display ability was observed.

The phosphoric acid-esterified PVA employed was formed by allowing PVA with orthophosphoric acid by pouring 30 cc of 85% of orthophosphoric acid into 10 g of a PVA (polymerization degree: 500, saponification degree: 88 mole %) while under heating at 70° C.

EXAMPLES 6–7

Except for using glyoxal in place of the cross linking agent used in preparation of Sample No. 5 in Example 5, the same procedure as in Example 5 was followed to prepare a display device (Sample No. 6). Similarly, by using malondialdehyde as the cross linking agent, another display device was prepared (Sample No. 7).

The compulsory test with lapse of time was conducted for Samples No. 6 and No. 7 in the same manner as in Example 3 to obtain the result that the increase of current was 10% or less even after 1000 hours, and yet good display was obtained.

EXAMPLE 8

Except for using malondialdehyde in place of the cross linking agent used in preparation of Sample No. 3 in Example 3, the same procedure as in Example 3 was followed to prepare a display device (Sample No. 8).

The compulsory test with lapse of time was conducted for Sample No. 8 in the same manner as in Example 3 to obtain the result that the increase of current was 10% or less even after 1000 hours, and yet good display was obtained.

EXAMPLE 9

To a 5% aqueous solution of a polyvinyl alcohol having an acetoacetyl group "Gosfainer Z 200" produced by Nippon Gosei Kagaku Kogyo Co., Ltd.) were added ammonium dichromate and glyoxal (1:1) in an amount of 5 wt. % based on the solid of the PVA. This solution was applied on an electrode plate by means of a spinner coating machine rotating at 3000 rpm for 10 seconds to form a film of 1500 Å, followed by drying by heating at a temperature of 200° C. for 30 minutes.

As the next step, for removing the film at the terminal portions and the seal spacer forming portion on the electrode plate, a mask was formed at the portion excluding the terminal portions and the seal spacer forming portion by employing the conventional photolighographic step, followed by dipping of the electrode plate into a 10% aqueous chromic acid ($CrO_3$) solution for 10 minutes thereby to remove the film formed on the non-mask portion. Then, the resist was peeled off, and the electrode plate was heated again at 180° C. for 15 minutes.

Subsequently, a pair of electrode plates having thereon the polyvinyl alcohol films were subjected to aligning treatment by rubbing in one direction with a cloth and then assembled in a cell so that the rubbing directions on both films may be perpendicular to each other, followed by sealing of a nematic liquid crystal having positive dielectric anisotropy ("ZLI-1253", produced by Merck, Co., West Germany), and then the polarizing films on both faces outside of the cell were laminated so that the polarizing directions of the polarizing films may be parallel to the rubbing directions on the adjacent substrates to prepare a display device (this is called Sample No. 9).

For this sample, compulsory test with lapse of time was conducted by storing this sample under the conditions of a temperature of 85° C. and a relative humidity of 85% for 100 hours, 200 hours, 300 hours, 400 hours, 500 hours and 1000 hours, respectively, and the increase of current in the liquid crystal display device for each lapse of time was measured. As the result, in the Sample No. 9 of the present invention, the increase of current was 10% or less even after 1000 hours, and yet sufficient liquid crystal display ability was observed.

EXAMPLE 10

Except for using dimethylol melamine in place of the cross linking agent used in preparation of Sample No. 9 in Example 9, the same procedure as in Example 9 was followed to prepare a display device (Sample No. 10).

The compulsory test with lapse of time was conducted for Sample No. 10 in the same manner as in Example 9 to obtain the result that the increase of current was 10% or less even after 1000 hours, and yet sufficient liquid crystal display ability was observed.

What I claim is:

1. An electro-optical device comprising a liquid crystal layer sandwiched between two electrode plates, wherein at least one of said electrode plates has a film of a resin hardened in the presence of a cross linking agent on its surface and said film is subjected to aligning treatment.

2. An electro-optical device according to claim 1, wherein the film of resin is a film of a water-soluble resin hardened in the presence of a cross linking agent.

3. An electro-optical device according to claim 2, wherein the water-soluble resin is a polyvinyl alcohol.

4. An electro-optical device according to claim 3, wherein the polyvinyl alcohol is a polyvinyl alcohol having a residue having active hydrogen.

5. An electro-optical device according to claim 4, wherein the residue having active hydrogen is selected from the group consisting of acetoacetyl group and phosphoric acid ester group.

6. An electro-optical device according to claim 4, wherein the residue having active hydrogen is contained in an amount of 0.05 mole % or more.

7. An electro-optical device according to claim 4, wherein the residue having active hydrogen is contained in an amount of 0.1 to 40 mole %.

8. An electro-optical device according to claim 4, wherein the residue having active hydrogen is contained in an amount of 0.2 to 20 mole %.

9. An electro-optical device according to claim 1, wherein the cross linking agent is a compound having at least two active groups.

10. An electro-optical device according to claim 1, wherein the cross linking agent is at least one selected from the group consisting of ammonium dichromate, magnesium chloride, dialdehydes and dimethylol melamine.

11. An electro-optical device according to claim 10, wherein the dialdehydes are at least one selected from the group consisting of glyoxal, malondialdehyde, succindialdehyde, glutaric dialdehyde, maleicdialdehyde, phthalaldehye, isophthalaldehyde and terephthalaldehyde.

12. An electro-optical device according to claim 10, wherein the dialdehyde is glyoxal.

13. An electro-optical device according to claim 1, wherein the cross linking agent is used at a proportion of 0.1 to 100 parts by weight based on 100 parts by weight of the resin.

14. An electro-optical device according to claim 1, wherein the cross linking agent is used at a proportion of 1 to 50 parts by weight based on 100 parts by weight of the resin.

15. An electro-optical device according to claim 1, wherein the hardened film of the resin is a dyed film.

16. An electro-optical device according to claim 1, wherein the liquid crystal is a nematic liquid crystal having positive dielectric anisotropy.

17. An electro-optical device according to claim 1, wherein the aligning treatment is rubbing treatment.

* * * * *

UNITED STATES PATENT AND TRADEMARK OFFICE
CERTIFICATE OF CORRECTION

PATENT NO. : 4,561,725

DATED : December 31, 1985

INVENTOR(S) : Yoshio Hotta

It is certified that error appears in the above-identified patent and that said Letters Patent is hereby corrected as shown below:

Column 1, line 12, "Prior Arts" should be --Prior Art--.
Column 1, line 16, "ultra-sonic" should be --ultrasonic--.
Column 1, line 23, "ultra-sonic" should be --ultrasonic--.
Column 1, line 56, "axes to take" should be --axes are known to take--.
Column 2, line 21, "that is" should be --that it--.
Column 3, line 45, "phophoric" should be --phosphoric--.
Column 3, line 67, "suitable be" should be --suitably may be--.
Column 4, line 39, "phosphoric acid" should be --phosphoric acids--.
Column 5, line 66, "ZLI-b1565" should be --ZLI-1565--.
Column 7, line 16, "(ZLI-1253" should be --("ZLI-1253"--.
Column 7, lines 67-68, "photolighographic" should be --photolithographic--.
Column 8, line 1, "solution of" should be --solution for--.
Column 8, line 65, "allowing PVA" should be --allowing PVA to react--.
Column 9, line 27, "group Gosfainer" should be --group ("Gosfainer--.

UNITED STATES PATENT AND TRADEMARK OFFICE
CERTIFICATE OF CORRECTION

PATENT NO. : 4,561,725

DATED : December 31, 1985

INVENTOR(S) : Yoshio Hotta

It is certified that error appears in the above-identified patent and that said Letters Patent is hereby corrected as shown below:

Column 9, lines 39-40, "photolighographic" should be --photolithographic--.
Column 10, line 50, "phthalaldehye" should be --phthalaldehyde--.

Signed and Sealed this

Sixteenth Day of December, 1986

Attest:

DONALD J. QUIGG

*Attesting Officer*   *Commissioner of Patents and Trademarks*